(12) United States Patent
Shi

(10) Patent No.: US 10,319,321 B2
(45) Date of Patent: Jun. 11, 2019

(54) GOA CIRCUIT AND A LIQUID CRYSTAL DISPLAY

(71) Applicant: Shenzhen China Star Optoelectronics Technology Co., Ltd., Shenzhen, Guangdong (CN)

(72) Inventor: Longqiang Shi, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 166 days.

(21) Appl. No.: 15/327,637

(22) PCT Filed: Jan. 16, 2017

(86) PCT No.: PCT/CN2017/071243
§ 371 (c)(1),
(2) Date: Jan. 19, 2017

(87) PCT Pub. No.: WO2018/120321
PCT Pub. Date: Jul. 5, 2018

(65) Prior Publication Data
US 2018/0211613 A1    Jul. 26, 2018

(30) Foreign Application Priority Data
Dec. 30, 2016    (CN) .......................... 2016 1 1259129

(51) Int. Cl.
*G09G 3/36*    (2006.01)
*G02F 1/133*    (2006.01)

(52) U.S. Cl.
CPC ....... *G09G 3/3674* (2013.01); *G02F 1/13306* (2013.01); *G09G 3/36* (2013.01);
(Continued)

(58) Field of Classification Search
CPC .. G09G 3/3674; G09G 3/3677; G09G 3/3266; G09G 2310/0264;
(Continued)

(56) References Cited

U.S. PATENT DOCUMENTS

| 6,664,943 B1 | 12/2003 | Nakajima |
| 7,760,167 B2 | 7/2010 | Uchino |

(Continued)

FOREIGN PATENT DOCUMENTS

| CN | 106157914 A | 11/2016 |
| CN | 106205528 A | 12/2016 |

*Primary Examiner* — Darlene M Ritchie
(74) *Attorney, Agent, or Firm* — Andrew C. Cheng

(57) ABSTRACT

The present application discloses a GOA circuit and a liquid crystal display including: a pull-up circuit, including a first switching transistor; a pull-down circuit, including a second switching transistor; a scanning output terminal coupled to the second connecting terminal of the first switching transistor, and a first connecting terminal of the second switching transistor; and a clamping circuit, coupling to the second connecting terminals of the first switching transistor and the second switching transistor, and coupling to the control terminals of the first switching transistor and the second switching transistor, when the scanning output terminal outputs a first electric level, controlling the electric level of the control terminal of the second switching transistor to be lower than the electric level of the second connecting terminal of the second switching transistor. The present application prevents the transistor from erroneously turning on or off due to the turn on threshold shift.

11 Claims, 3 Drawing Sheets

(52) U.S. Cl.
CPC ... *G09G 3/3677* (2013.01); *G09G 2300/0408* (2013.01); *G09G 2310/0264* (2013.01)

(58) Field of Classification Search
CPC ... G09G 2310/0267; G09G 2310/0286; G09G 2310/0289; G09G 2300/0408
See application file for complete search history.

(56) References Cited

U.S. PATENT DOCUMENTS

| | | | |
|---|---|---|---|
| 9,461,627 B2 | 10/2016 | Dai | |
| 9,589,520 B2 | 3/2017 | Dai | |
| 2012/0163528 A1* | 6/2012 | Jang | G09G 3/3688 377/64 |
| 2015/0043703 A1* | 2/2015 | Tan | G11C 19/28 377/68 |
| 2015/0263722 A1* | 9/2015 | Kim | H03K 17/162 315/161 |
| 2015/0317954 A1* | 11/2015 | Jang | G09G 3/20 345/213 |
| 2016/0253976 A1* | 9/2016 | Jang | G09G 3/3677 345/208 |
| 2016/0267854 A1* | 9/2016 | Kim | G09G 3/3466 |
| 2018/0174545 A1* | 6/2018 | Li | G09G 3/3648 |

* cited by examiner

GOA CIRCUIT AND A LIQUID CRYSTAL DISPLAY

FIELD OF THE INVENTION

The present application relates to a liquid crystal display technology field, and more particularly to a GOA circuit and a liquid crystal display.

BACKGROUND OF THE INVENTION

Gate Driver on Array, GOA technology can help to fabricate narrow border or borderless display products, and it can reduce the binding process for the external integrated circuit, IC, is conducive to enhance productivity and reduce product costs, which has been widely used and research.

Indium Gallium Zinc Oxide, IGZO, because of its high mobility and good device stability, in the fabrication of GOA circuit, it can reduce the complexity of GOA circuit, has been widely used. In particular, because of its high mobility, when used in the fabrication of thin film transistors in GOA circuits, the size of the thin film transistor is smaller relative to the thin film transistor fabricated using amorphous silicon, a-Si, which is conducive to the production of narrow-border display; at the same time, due to the good device stability, it is possible to reduce the number of power supplies and thin film transistors for stabilizing the performance of the thin film transistor, and then to create a relatively simple GOA circuit, and reduce power consumption.

However, the turn-on voltage Vth of the thin-film transistor fabricated by IGZO tends to be negative values, resulting in the failure of the GOA circuit.

SUMMARY OF THE INVENTION

The technology problem majorly solved by the present application is provide a GOA circuit and a liquid crystal display capable of preventing the transistor from erroneously turning on or off and causing a problem of circuit output error due to threshold shift.

In order to solve the above-mentioned technical problems, the present application adopts a technical approach is to provide a GOA circuit, the GOA circuit includes a pull-up circuit, including a first switching transistor; a pull-down circuit, including a second switching transistor; a scanning output terminal coupled to the second connecting terminal of the first switching transistor, and a first connecting terminal of the second switching transistor; a clamping circuit, coupling to the second connecting terminals of the first switching transistor and the second switching transistor, and coupling to the control terminals of the first switching transistor and the second switching transistor. When the scanning output terminal outputs a first electric level, controlling the electric level of the control terminal of the second switching transistor to be lower than the electric level of the second connecting terminal of the second switching transistor, and when the scanning output terminal outputs the second electric level, controlling the electric level of the control terminal of the first switching transistor to be lower than the electric level of the second connecting terminal of the first switching transistor, and the first electric level is to be higher than the second electric level.

Wherein the clamping circuit includes: a first clamping terminal, inputting a third electric level coupled to the second connecting terminal of the second switching transistor; a second clamping terminal, inputting a fourth electric level coupled to the control terminal of the first switching transistor and coupled to the control terminal of the second switching transistor through a control circuit; wherein the third electric level is higher than the fourth electric level; and the control circuit is adapted to control the control terminal of the second switching transistor to receive the third electric level of the second clamping terminal when the scanning output terminal outputs the first electric level, and to control the control terminal of the first switching transistor receiving the third electric level of the second clamping terminal when the scanning output terminal outputs the second electric level.

Wherein the control circuit includes a third switching transistor having a control terminal coupled to the control terminal of the first switching transistor, a first connecting terminal coupled to the control terminal of the second switching transistor and a second connecting terminal coupled to the second clamping terminal; a fourth switching transistor having a control terminal and a first connecting terminal coupled to the third clamping terminal and a second connecting terminal coupled to the control terminal of the second switching transistor, wherein the third clamping terminal is inputted a high electric level; a fifth switching transistor having a control terminal coupled to the control terminal of the second switching transistor and a second connecting terminal coupled to the second clamping terminal; a sixth switching transistor having a control terminal coupled to the control terminal of the second switching transistor, a first connecting terminal coupled to the control terminal of the first switching transistor and a second connecting terminal coupled to the first connecting terminal of the fifth switching transistor.

Wherein the control circuit further includes a first capacitor coupled between the first connecting terminal and the second connecting terminal of the sixth switching transistor.

Wherein the GOA circuit further includes: a pull-up control circuit, including: a seventh switching transistor having a control terminal inputted a clock signal, and a first connecting terminal inputted a stage transmission signal; an eighth switching transistor having a control terminal inputted the clock signal and a first connecting terminal coupled to the second connecting terminal of the seventh switching transistor and a second connecting terminal coupled to the control terminal of the first switching transistor.

Wherein the pull-up control circuit further includes a second capacitor coupled between the first connecting terminal and the second connecting terminal of the eighth switching transistor.

Wherein the first connecting terminal of the eighth switching transistor is further coupled to the second connecting terminal of the sixth switching transistor.

Wherein the pull-up circuit further includes a third capacitor coupled between the control terminal and the second connecting terminal of the first switching transistor.

Wherein further includes a downstream circuit including a ninth switching transistor with a control terminal coupled to the control terminal of the first switching transistor, a first connecting terminal coupled to the first connecting terminal of the first switching transistor and a second connecting terminal coupled to the stage transmission output terminal.

In order to solved the problem mentioned above, the present application adopts another technical approach is to provide a liquid crystal display, the liquid crystal display includes a GOA circuit, the GOA circuit includes a pull-up circuit, including a first switching transistor; the pull-up circuit further including a third capacitor coupled between the control terminal and the second connecting terminal of the first switching transistor; a pull-down circuit, including a second switching transistor; a scanning output terminal coupled to the second connecting terminal of the first switching transistor, and a first connecting terminal of the second switching transistor; a downstream circuit including a ninth switching transistor with a control terminal coupled to the control terminal of the first switching transistor, a first connecting terminal coupled to the first connecting terminal of the first switching transistor and a second connecting terminal coupled to the stage transmission output terminal; and a clamping circuit, coupling to the second connecting terminals of the first switching transistor and the second switching transistor, and coupling to the control terminals of the first switching transistor and the second switching transistor. When the scanning output terminal outputs a first electric level, controlling the electric level of the control terminal of the second switching transistor to be lower than the electric level of the second connecting terminal of the second switching transistor, and when the scanning output terminal outputs the second electric level, controlling the electric level of the control terminal of the first switching transistor to be lower than the electric level of the second connecting terminal of the first switching transistor, and the first electric level to be higher than the second electric level.

Wherein the clamping circuit includes a first clamping terminal, inputting a third electric level coupled to the second connecting terminal of the second switching transistor; a second clamping terminal, inputting a fourth electric level coupled to the control terminal of the first switching transistor and coupled to the control terminal of the second switching transistor through a control circuit; wherein the third electric level is higher than the fourth electric level; and the control circuit is adapted to control the control terminal of the second switching transistor to receive the third electric level of the second clamping terminal when the scanning output terminal outputs the first electric level, and to control the control terminal of the first switching transistor receiving the third electric level of the second clamping terminal when the scanning output terminal outputs the second electric level.

Wherein the control circuit includes a third switching transistor having a control terminal coupled to the control terminal of the first switching transistor, a first connecting terminal coupled to the control terminal of the second switching transistor and a second connecting terminal coupled to the second clamping terminal; a fourth switching transistor having a control terminal and a first connecting terminal coupled to the third clamping terminal and a second connecting terminal coupled to the control terminal of the second switching transistor, wherein the third clamping terminal is inputted a high electric level; a fifth switching transistor having a control terminal coupled to the control terminal of the second switching transistor and a second connecting terminal coupled to the second clamping terminal; a sixth switching transistor having a control terminal coupled to the control terminal of the second switching transistor, a first connecting terminal coupled to the control terminal of the first switching transistor and a second connecting terminal coupled to the first connecting terminal of the fifth switching transistor.

Wherein the control circuit further includes a first capacitor coupled between the first connecting terminal and the second connecting terminal of the sixth switching transistor.

Wherein the GOA circuit further includes a pull-up control circuit, including: a seventh switching transistor having a control terminal inputted a clock signal, and a first connecting terminal inputted a stage transmission signal; an eighth switching transistor having a control terminal inputted the clock signal and a first connecting terminal coupled to the second connecting terminal of the seventh switching transistor and a second connecting terminal coupled to the control terminal of the first switching transistor.

Wherein the pull-up control circuit further includes a second capacitor coupled between the first connecting terminal and the second connecting terminal of the eighth switching transistor.

Wherein the first connecting terminal of the eighth switching transistor is further coupled to the second connecting terminal of the sixth switching transistor.

In order to solve the above-mentioned technical problems, the present application adopts another technical approach is to provide a liquid crystal display including a GOA circuit, wherein the GOA circuit includes: a pull-up circuit, including a first switching transistor; a pull-down circuit, including a second switching transistor; a scanning output terminal coupled to the second connecting terminal of the first switching transistor, and a first connecting terminal of the second switching transistor; and a clamping circuit, coupling to the second connecting terminals of the first switching transistor and the second switching transistor, and coupling to the control terminals of the first switching transistor and the second switching transistor, when the scanning output terminal outputs a first electric level, controlling the electric level of the control terminal of the second switching transistor to be lower than the electric level of the second connecting terminal of the second switching transistor, and when the scanning output terminal outputs the second electric level, controlling the electric level of the control terminal of the first switching transistor to be lower than the electric level of the second connecting terminal of the first switching transistor, and the first electric level is to be higher than the second electric level.

Wherein the clamping circuit includes a first clamping terminal, inputting a third electric level coupled to the second connecting terminal of the second switching transistor; a second clamping terminal, inputting a fourth electric level coupled to the control terminal of the first switching transistor and coupled to the control terminal of the second switching transistor through a control circuit; wherein the third electric level is higher than the fourth electric level; and the control circuit is adapted to control the control terminal of the second switching transistor to receive the third electric level of the second clamping terminal when the scanning output terminal outputs the first electric level, and to control the control terminal of the first switching transistor receiving the third electric level of the second clamping terminal when the scanning output terminal outputs the second electric level.

Wherein the control circuit further includes a first capacitor coupled between the first connecting terminal and the second connecting terminal of the sixth switching transistor.

The present application has the advantages, comparing to the conventional technology, the GOA circuit of the present application includes a pull-up circuit including a first switching transistor, a pull-down circuit including a second switching transistor, a scanning output terminal coupled to the second connecting terminal of the first switching transistor, and a first connecting terminal of the second switching transistor; a clamping circuit coupling to the second connecting terminals of the first switching transistor and the second switching transistor, and coupling to the control terminals of the first switching transistor and the second switching transistor, when the scanning output terminal outputs a first electric level, controlling the electric level of the control terminal of the second switching transistor to be lower than the electric level of the second connecting terminal of the second switching transistor, and when the scanning output terminal outputs the second electric level, controlling the electric level of the control terminal of the first switching transistor to be lower than the electric level of the second connecting terminal of the first switching transistor, and the first electric level to be higher than the second electric level. In the above-mentioned way, the switching transistor in the pull-down circuit can be completely turned off during the scanning output stage, so that the output of the scanning terminal can be prevented from being erroneously turned on when the threshold value of the second switching transistor is shifted.

BRIEF DESCRIPTION OF THE DRAWINGS

In order to more clearly illustrate the embodiments of the present application or prior art, the following FIG.s will be described in the embodiments are briefly introduced. It is obvious that the drawings are merely some embodiments of the present application, those of ordinary skill in this field can obtain other FIG.s according to these FIG.s without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention.

Figure 1:
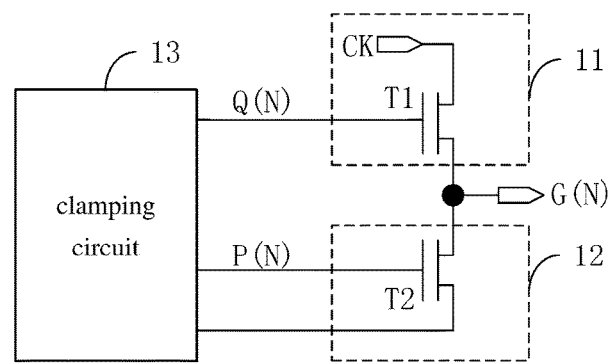
FIG. 1 is a schematic structural view of a GOA circuit according to a first embodiment of the present application.

Referring to FIG. 1 is a schematic structural view of a GOA circuit according to a first embodiment of the present application, the GOA circuit includes:

A pull-up circuit 11, includes a first switching transistor T1.

A pull-down circuit 12, includes a second switching transistor T2.

The scanning output terminal G(N) is coupled between a second connecting terminal of the first switching transistor T1 and a first connecting terminal of the second switching transistor T2.

Wherein, the first connecting terminal of the first switching transistor T1 is supplied with the first clock signal CK, and when a control terminal of the first switching transistor is at the high electric level, the first switching transistor T1 is turned on, and the first clock signal CK is outputted through the scanning output terminal G(N).

A clamping circuit 13, couples the second connecting terminals of the first switching transistor T1 and the second switching transistor T2, and coupling couples the control terminals of the first switching transistor T1 and the second switching transistor T2. When the scanning output terminal G(N) outputs a first electric level, the clamping circuit controlling the electric level of the control terminal of the second switching transistor T2 to be lower than the electric level of the second connecting terminal of the second switching transistor T2, and when the scanning output terminal G(N) outputs the second electric level, controlling the electric level of the control terminal of the first switching transistor T1 to be lower than the electric level of the second connecting terminal of the first switching transistor T1, and the first electric level to be higher than the second electric level.

Here, defining the electric level of the control terminal of T1 is Q(N), the electric level of the control terminal of T2 is P(N).

It can be understood that, when G(N) outputs a high electric level, T1 turns on and Q(N) is at a high electric level; at this time, T2 should be ensured to be completely turned off, in order to prevent the turn on threshold of T2 from shifting, the clamping circuit 13 inputs Vss2 to the control terminal of T2 and inputs Vss1 to the second connecting terminal of T2, and Vss1>Vss2, so as to ensure that T2 is completely turned off.

When G(N) outputs a low electric level, T2 is needed to be turned on, and the electric level of G(N) is pulled low by the low electric level Vss1. Accordingly, the clamping circuit 13 inputs a high electric level to the control terminal of T2, and inputs Vss1 to the second connecting terminal of T2, to ensure T2 is turned on.

comparing to the conventional technology, the GOA circuit of the present embodiment includes: the pull-up circuit including the first switching transistor; the pull-down circuit including the second switching transistor; the scanning output terminal coupling between the second connecting terminal of the first switching transistor and the first connecting terminal of the second switching transistor; the clamping circuit coupling the second connecting terminals of the first switching transistor and the second switching transistor, and coupling the control terminals of the first switching transistor and the second switching transistor, when the scanning output terminal outputs the first electric level, controlling the electric level of the control terminal of the second switching transistor to be lower than the electric level of the second connecting terminal of the second switching transistor, and when the scanning output terminal outputs the second electric level, controlling the electric level of the control terminal of the first switching transistor to be lower than the electric level of the second connecting terminal of the first switching transistor, and the first electric level to be higher than the second electric level. By the above-mentioned way, the switching transistor in the pull-down circuit can be completely turned off during the scanning output stage, so that the output of the scanning terminal can be prevented from being erroneously turned on when the threshold value of the second switching transistor is shifted.

Figure 2:
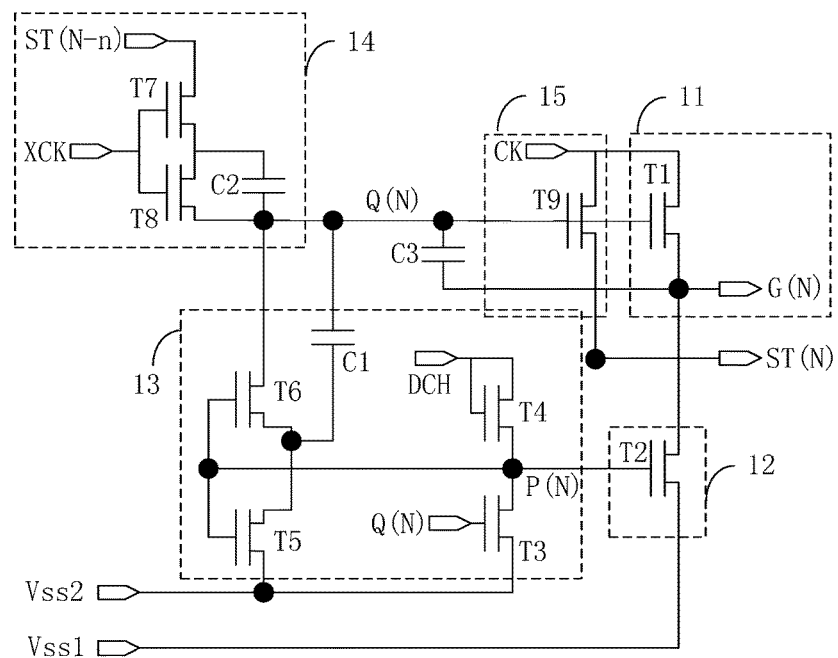
FIG. 2 is a schematic diagram of a circuit connection according to a second embodiment of the GOA circuit of the present application.

Referring to FIG. 2, FIG. 2 is a schematic diagram of a circuit connection according to a second embodiment of the GOA circuit of the present application. The GOA circuit includes the pull-up circuit 11, the pull-down circuit 12, the clamping circuit 13, a pull-up control circuit 14, and a downstream circuit 15.

Wherein, the pull-up circuit 11 and the pull-down circuit 12 are the same as those of the first embodiment, and will not be described here.

Wherein the clamping circuit 13 includes:

The first clamping terminal Vss1, inputting the third electric level Vss1 and is coupled to the second connecting terminal of the second switching transistor T2.

The second clamping terminal Vss2, inputting the fourth electric level Vss2, and is coupled to the control terminal of the first switching transistor T1 through a control circuit and coupled to the control terminal of the second switching transistor T2; wherein the third electric level Vss1 is higher than the fourth electric level Vss2.

The control circuit is adapted to control the control terminal of the second switching transistor T2 to receive the third electric level of the second clamping terminal Vss2 when the scanning output terminal G(N) outputs the first electric level, and to control the control terminal of the first switching transistor T1 receiving the third electric level of the second clamping terminal Vss2 when the scanning output terminal G(N) outputs the second electric level.

In particular, the control circuit includes:

A third switching transistor T3 has a control terminal coupled to the control terminal of the first switching transistor T1, a first connecting terminal coupled to the control terminal of the second switching transistor T2 and a second connecting terminal coupled to the second clamping terminal Vss2.

A fourth switching transistor T4 has a control terminal and a first connecting terminal coupled to the third clamping terminal DCH and a second connecting terminal coupled to the control terminal of the second switching transistor T2, wherein the third clamping terminal DCH is inputted a high electric level.

A fifth switching transistor T5 has a control terminal coupled to the control terminal of the second switching transistor T2 and a second connecting terminal coupled to the second clamping terminal Vss2.

A sixth switching transistor T6 has a control terminal coupled to the control terminal of the second switching transistor T2, a first connecting terminal coupled to the control terminal of the first switching transistor T1 and a second connecting terminal coupled to the first connecting terminal of the fifth switching transistor T5. Wherein the pull-up control circuit 14 includes:

A seventh switching transistor T7 has a control terminal inputted a second clock signal XCK, and a first connecting terminal inputted a stage transmission signal ST(N-n).

An eighth switching transistor T8 has a control terminal inputted the second clock signal XCK and a first connecting terminal coupled to the second connecting terminal of the seventh switching transistor T7 and a second connecting terminal coupled to the control terminal of the first switching transistor T1.

Wherein the downstream circuit 15 includes:

A ninth switching transistor T9 has a control terminal coupled to the control terminal of the first switching transistor T1 and a first connecting terminal coupled to a first connecting terminal of the first switching transistor T1 and a second connecting terminal coupled to the stage transmission output terminal ST(N).

In addition, the control circuit further includes a first capacitor C1 coupled between the first connecting terminal and the second connecting terminal of the sixth switching transistor T6. The pull-up control circuit 14 further includes a second capacitor C2 coupled between the first connecting terminal and the second connecting terminal of the eighth switching transistor T8. The pull-up circuit 11 further includes a third capacitor C3 coupled between the control terminal and the second connecting terminal of the first switching transistor T1.

It is worth noting that the role of C1 is that, when P(N) is at low electric level and T6 is turned off, by the bootstrap function of C1 to maintain the second connecting terminal of T6 at a high electric level, it makes the electric level of the control terminal of T6 lower than the second connecting terminal, preventing T6 from erroneously turning on due to the shift of the turn on threshold.

The function of C2 is that, when XCK is at low electric level and T8 is turned off, by the bootstrap function of C2 to maintain the high electric level of the first connecting terminal of T8, and make the electric level of the control terminal of T8 lower than the first connecting terminal of T8, preventing from erroneously turning on due to the shift of the turn on threshold.

The role of C3 is that, after the turned off of T8, when Q(N) is at high electric level, T1 turned on and input CK signal with high electric level, through the high electric level of G(N) stage and the bootstrap of C3, the electric level of Q(N) is further raised higher to ensure the turned on of T1.

Alternatively, the present embodiment will be described below in a specific embodiment:

In the present embodiment, the first connecting terminal of the first switching transistor T1 is inputted with the first clock signal CK, the control terminals of the seventh switching transistor T7 and the eighth switching transistor T8 are inputted with the second clock signal XCK, the first connecting terminal of the seventh switching transistor T7 is inputted with the stage transmission signal ST(N-4); the first clock signal CK is opposite to the second clock signal XCK.

Figure 3:
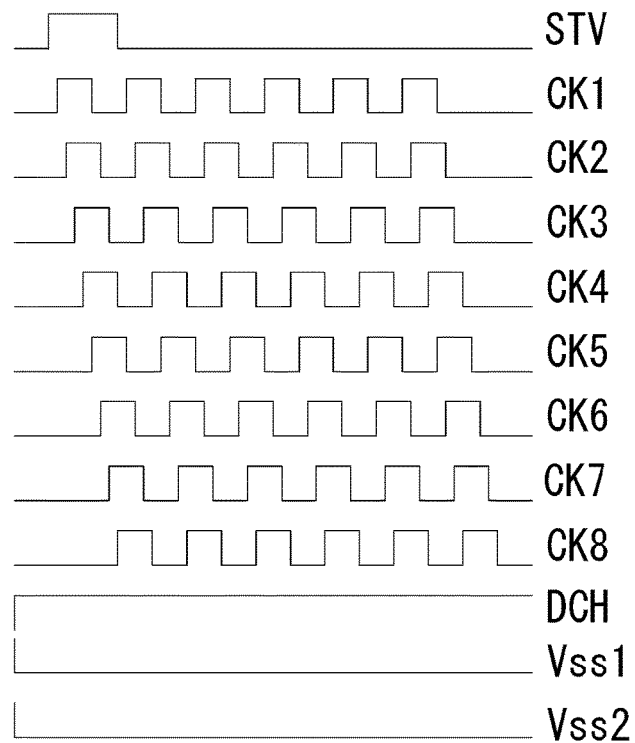
FIG. 3 is a schematic diagram of a clock signal according to a second embodiment of the GOA circuit of the present application.

In particular, as shown in FIG. 3, the present embodiment employs eight CK clock signals, i.e., the Nth CK signal of the GOA circuit is the same as the N+8th CK signal of the GOA circuit and is opposite to the N+4th CK signal of the GOA circuit. The DCH is for the high-voltage direct current. Vss1, Vss2 are two DC power supplies, Vss1>Vss2.

Figure 4:
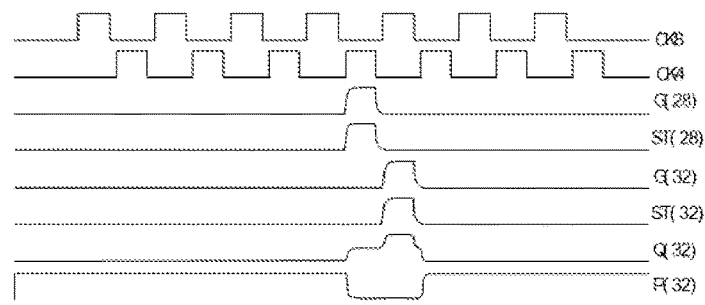
FIG. 4 is a schematic diagram of an output signal according to a second embodiment of the GOA circuit of the present application.

By adoption of the waveform mentioned above into the circuit, the following in conjunction with FIG. 4, taking the 32th level GOA (G32) as an example to illustrate the working process of the circuit.

When G(N) =G(32), ST(N-4) =ST(28), G(32) is controlled by CK8, ST(28) is controlled by CK4 and XCK is CK4.

When ST(28) is at high electric level, CK4 is at high electric level, T7, T8 turn on, the high electric level of ST(28) is inputted into Q(32), Q is at high electric level. At the same time, T1 turns on, at this time, CK8 is at low electric level, so G(32) is at low electric level; at the same time, the high electric level of the Q point makes T3 turns on, P(32) is pulled down by Vss2, T2, T5, T6 are turned off, at this time, the electric level Vss2 of the control terminal of T2, T5 is smaller than its electric level Vss1 of the second control terminal, it will not erroneously turn on caused by the shift of the turn on threshold, the low electric level of Vss1 will not affect the electric level of G(N).

Then ST8(28) is at low electric level, CK4 is at low electric level, T7, T8 turned off, at this time, CK8 is at high electric level, G(32) outputs high electric level, Q(32) has the coupling effect by the capacitor C3 and is raised to a higher electric level; P(32) continues to remain at low electric level.

It should be noted that, if the turn on threshold Vth of the T2, T5, T8 is too negative, the high electric level of G(32), Q(32) will be missed, leading to the failure of the GOA circuit. In the present embodiment, the P (N) senses Vss2, the second terminal of the T2 senses Vss1, Vgs=Vss2−Vss1 is a negative value, and T2 can be effectively turned off. At the same time, when Q(32) is at a higher electric level, by the coupling effect by the capacitors C1, C2, the voltage of the second connecting terminal of T6, the first connecting terminal of T8 are raised. The turn on threshold voltage Vgs is a negative value, and the TFT can be effectively turn off. Then CK4 is at high electric level, T7, T8 turn on, the low electric level is inputted to Q(32), Q(32) is pulled down to low electric level; at the same time, P(32) is at high electric level, T2 , T5, T6 turn on, Q(32) and G(32) are pulled down to low electric level.

At this time, if the Vth of T1 is too negative, will lead to CK8 signal transmitted to G(32). The low electric level of Q(32) in the present embodiment is equal to Vss2, and the low electric level of G(32) is Vss1. Therefore, the turn on of T1 Vgs=Vss2−Vss1 and is less than zero, thus ensuring that the electric level of CK is not be wrongly charged to G(32).

The GOA circuit according to the present embodiment can ensure that the TFT does not erroneously turn on due to the threshold shift through the low electric level signals of Vss1 and Vss2 and the cooperation of a plurality of capacitances.

Figure 5:
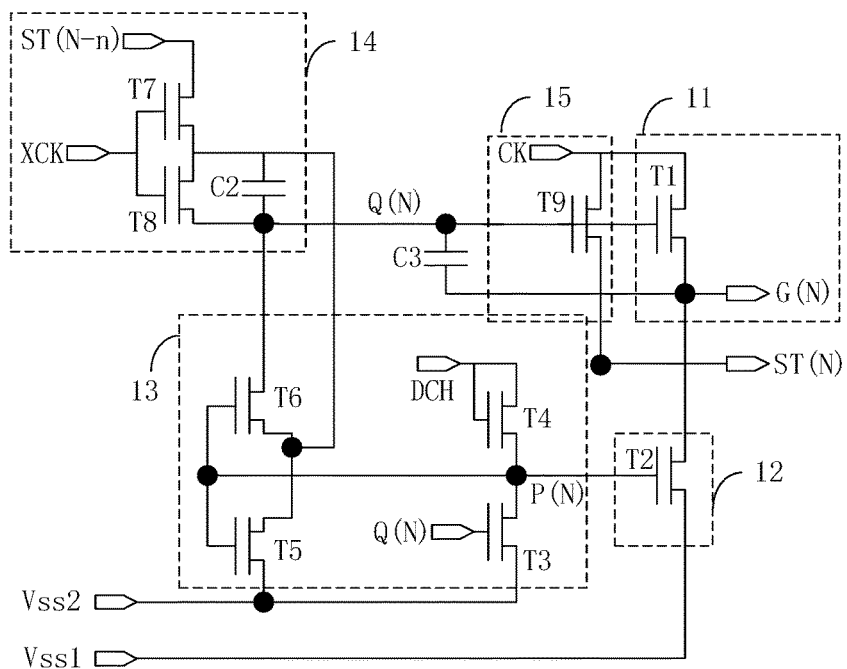
FIG. 5 is a schematic diagram of a circuit connection according to a third embodiment of the GOA circuit of the present application.

Referring to FIG. 5, FIG. 5 is a schematic diagram of a circuit connection according to a third embodiment of the GOA circuit of the present application. The GOA circuit includes a pull-up circuit 11, a pull-down circuit 12, a clamping circuit 13, a pull-up control circuit 14, and a downstream circuit 15.

It should be noted that, the difference from the second embodiment is that the first capacitor C1 is removed from the GOA circuit of the present embodiment, the first connecting terminal of the eighth switching transistor T8 is coupled to the second connecting terminal of the sixth switching transistor T6. Such as the second capacitor C2 is also coupled to the first and second connecting terminals of the sixth switching transistor T6, so that a capacitance can be reduced, which facilitates the realization of the narrow border of the liquid crystal display.

It is to be understood that the connections of the other circuit elements of the present embodiment is the same as that of the above-described second embodiment, and will not be described here.

It can be understood that, by person skilled in the art can understand that the first and second connecting terminals of the above-described switching transistor do not represent the order of the pin of the switching transistor but rather the specific designation of the pin of the switch pin. The switching transistor mentioned in each of the above embodiments is a thin film transistor, TFT fabricated by IGZO, alternatively, the TFT in the above embodiment is N-type TFT, and the control terminal is a gate, the first connecting terminal is a source , the second connecting terminal is a drain, or the control terminal is a gate, the first connecting terminal is a drain and the second connecting terminal is a source.

Besides, in other embodiments, a P-type TFT can be used for the connection of circuits, and it is only necessary to adjust the control terminal electric level or the order of the source and the drain in accordance with the above-described embodiment.

Figure 6:
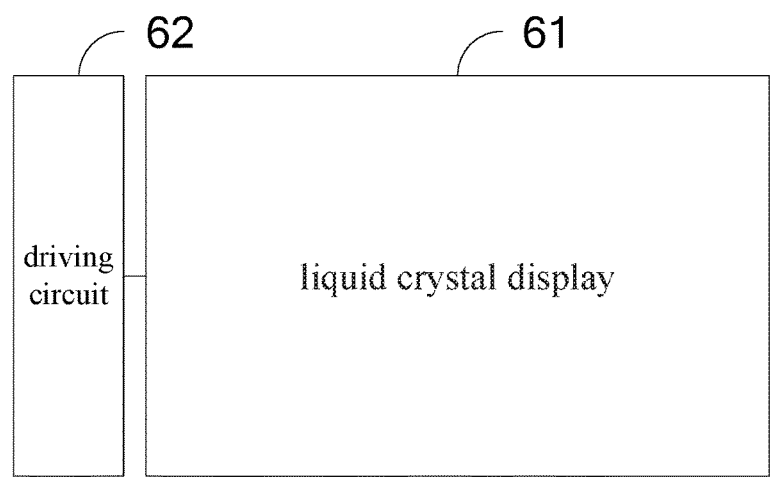
FIG. 6 is a schematic structural view of the liquid crystal display according to the embodiment of the present application.

Referring to FIG. 6, FIG. 6 is a schematic structural view of the liquid crystal display according to the embodiment of the present application. The liquid crystal display includes a display panel 61 and a driving circuit 62, wherein the driving circuit 62 is provided on the side of the display panel 61 for driving the display panel 61.

Specifically, the driving circuit 62 is the GOA circuit as described in each of the above embodiments, and the operation principle and its circuit configuration is similar, and will not be described again.

Above are embodiments of the present application, which does not limit the scope of the present application. Any modifications, equivalent replacements or improvements within the spirit and principles of the embodiment described above should be covered by the protected scope of the invention.

What is claimed is:

1. A liquid crystal display comprising a GOA circuit, wherein the GOA circuit comprises:
    a pull-up circuit, comprising a first switching transistor;
    a pull-down circuit, comprising a second switching transistor;
    a scanning output terminal coupled to a second connecting terminal of the first switching transistor, and a first connecting terminal of the second switching transistor;
    a downstream circuit comprising a ninth switching transistor with a control terminal coupled to a control terminal of the first switching transistor, a first connecting terminal coupled to a first connecting terminal of the first switching transistor and a second connecting terminal coupled to a stage transmission output terminal; and
    a clamping circuit, coupling to the second connecting terminal of the first switching transistor and a second connecting terminal of the second switching transistor, and coupling to the control terminal of the first switching transistor and a control terminal of the second switching transistor;
    when the scanning output terminal outputs a first electric level, controlling an electric level of the control terminal of the second switching transistor to be lower than an electric level of the second connecting terminal of the second switching transistor, and when the scanning output terminal outputs a second electric level, controlling an electric level of the control terminal of the first switching transistor to be lower than an electric level of the second connecting terminal of the first switching transistor, and the first electric level to be higher than the second electric level;
    wherein the clamping circuit comprises:
    a first clamping terminal, inputting a third electric level coupled to the second connecting terminal of the second switching transistor; and
    a second clamping terminal, inputting a fourth electric level coupled to the control terminal of the first switching transistor and coupled to the control terminal of the second switching transistor through a control circuit;
    wherein the third electric level is higher than the fourth electric level;
    the control circuit is adapted to control the control terminal of the second switching transistor to receive the fourth electric level of the second clamping terminal when the scanning output terminal outputs the first electric level, and to control the control terminal of the first switching transistor to receive the fourth electric level of the second clamping terminal when the scanning output terminal outputs the second electric level;

wherein the control circuit comprises:

a third switching transistor having a control terminal connected to the control terminal of the first switching transistor, a first connecting terminal connected to the control terminal of the second switching transistor and a second connecting terminal connected to the second clamping terminal;

a fourth switching transistor having a control terminal and a first connecting terminal connected to a third clamping terminal and a second connecting terminal connected to the control terminal of the second switching transistor, wherein a high electric level is inputted to the third clamping terminal;

a fifth switching transistor having a control terminal connected to the control terminal of the second switching transistor and a second connecting terminal connected to the second clamping terminal; and a sixth switching transistor having a control terminal connected to the control terminal of the second switching transistor, a first connecting terminal connected to the control terminal of the first switching transistor and a second connecting terminal connected to a first connecting terminal of the fifth switching transistor;

wherein the control circuit further comprises a first capacitor connected between the first connecting terminal and the second connecting terminal of the sixth switching transistor; and when the control terminal of the second switching transistor is controlled to receive the fourth electric level of the second clamping terminal, the first capacitor maintains the sixth transistor to be turned off.

2. The liquid crystal display according to claim 1, wherein the GOA circuit further comprises:

a pull-up control circuit, comprising:

a seventh switching transistor having a control terminal to which is inputted a clock signal, and a first connecting terminal to which is inputted a stage transmission signal;

an eighth switching transistor having a control terminal to which is inputted the clock signal and a first connecting terminal coupled to a second connecting terminal of the seventh switching transistor and a second connecting terminal coupled to the control terminal of the first switching transistor.

3. The liquid crystal display according to claim 2, wherein the pull-up control circuit further comprises a second capacitor coupled between the first connecting terminal and the second connecting terminal of the eighth switching transistor.

4. A GOA circuit comprising:

a pull-up circuit, comprising a first switching transistor;

a pull-down circuit, comprising a second switching transistor;

a scanning output terminal coupled to a second connecting terminal of the first switching transistor, and a first connecting terminal of the second switching transistor;

a clamping circuit, coupling to the second connecting terminal of the first switching transistor and a second connecting terminal of the second switching transistor, and coupling to the control terminal of the first switching transistor and a control terminal of the second switching transistor; and a downstream circuit comprising a ninth switching transistor with a control terminal coupled to a control terminal of the first switching transistor, a first connecting terminal coupled to a first connecting terminal of the first switching transistor and a second connecting terminal coupled to a stage transmission output terminal;

when the scanning output terminal outputs a first electric level, controlling an electric level of the control terminal of the second switching transistor to be lower than an electric level of the second connecting terminal of the second switching transistor, and when the scanning output terminal outputs a second electric level, controlling an electric level of the control terminal of the first switching transistor to be lower than an electric level of the second connecting terminal of the first switching transistor, and the first electric level to be higher than the second electric level;

wherein the clamping circuit comprises:

a first clamping terminal, inputting a third electric level coupled to the second connecting terminal of the second switching transistor; and a second clamping terminal, inputting a fourth electric level coupled to the control terminal of the first switching transistor and coupled to the control terminal of the second switching transistor through a control circuit; wherein the third electric level is higher than the fourth electric level;

the control circuit is adapted to control the control terminal of the second switching transistor to receive the fourth electric level of the second clamping terminal when the scanning output terminal outputs the first electric level, and to control the control terminal of the first switching transistor to receive the fourth electric level of the second clamping terminal when the scanning output terminal outputs the second electric level;

wherein the control circuit comprises:

a third switching transistor having a control terminal connected to the control terminal of the first switching transistor, a first connecting terminal connected to the control terminal of the second switching transistor and a second connecting terminal connected to the second clamping terminal;

a fourth switching transistor having a control terminal and a first connecting terminal connected to a third clamping terminal and a second connecting terminal connected to the control terminal of the second switching transistor, wherein a high electric level is inputted to the third clamping terminal;

a fifth switching transistor having a control terminal connected to the control terminal of the second switching transistor and a second connecting terminal connected to the second clamping terminal; and a sixth switching transistor having a control terminal connected to the control terminal of the second switching transistor, a first connecting terminal connected to the control terminal of the first switching transistor and a second connecting terminal connected to a first connecting terminal of the fifth switching transistor;

wherein the control circuit further comprises a first capacitor connected between the first connecting terminal and the second connecting terminal of the sixth switching transistor; and when the control terminal of the second switching transistor is controlled to receive the fourth electric level of the second clamping terminal, the first capacitor maintains the sixth transistor to be turned off.

5. The GOA circuit according to claim 4, wherein the GOA circuit further comprises:
a pull-up control circuit, comprising:
a seventh switching transistor having a control terminal to which is inputted a clock signal, and a first connecting terminal to which is inputted a stage transmission signal;
an eighth switching transistor having a control terminal to which is inputted the clock signal and a first connecting terminal coupled to a second connecting terminal of the seventh switching transistor and a second connecting terminal coupled to the control terminal of the first switching transistor.

6. The GOA circuit according to claim 5, wherein the pull-up control circuit further comprises a second capacitor coupled between the first connecting terminal and the second connecting terminal of the eighth switching transistor.

7. The GOA circuit according to claim 6, wherein the first connecting terminal of the eighth switching transistor is further coupled to the second connecting terminal of the sixth switching transistor.

8. A liquid crystal display comprising a GOA circuit, wherein the GOA circuit comprises:
a pull-up circuit, comprising a first switching transistor;
a pull-down circuit, comprising a second switching transistor;
a scanning output terminal coupled to a second connecting terminal of the first switching transistor, and a first connecting terminal of the second switching transistor;
a clamping circuit, coupling to the second connecting terminal of the first switching transistor and a second connecting terminal of the second switching transistor, and coupling to the control terminal of the first switching transistor and a control terminal of the second switching transistor;
a downstream circuit comprising a ninth switching transistor with a control terminal coupled to a control terminal of the first switching transistor, a first connecting terminal coupled to a first connecting terminal of the first switching transistor and a second connecting terminal coupled to a stage transmission output terminal; and
a pull-up control circuit, comprising a seventh switching transistor having a control terminal to which is inputted a clock signal and a first connecting terminal to which is inputted a stage transmission signal, and an eighth switching transistor having a control terminal to which is inputted the clock signal and a first connecting terminal coupled to a second connecting terminal of the seventh switching transistor and a second connecting terminal coupled to the control terminal of the first switching transistor;
the pull-up control circuit further comprises a second capacitor coupled between the first connecting terminal and the second connecting terminal of the eighth switching transistor, and the first connecting terminal of the eighth switching transistor is further coupled to the second connecting terminal of the sixth switching transistor;
when the scanning output terminal outputs a first electric level, controlling an electric level of the control terminal of the second switching transistor to be lower than an electric level of the second connecting terminal of the second switching transistor, and when the scanning output terminal outputs a second electric level, controlling an electric level of the control terminal of the first switching transistor to be lower than an electric level of the second connecting terminal of the first switching transistor, and the first electric level to be higher than the second electric level;
wherein the clamping circuit comprises:
a first clamping terminal, inputting a third electric level coupled to the second connecting terminal of the second switching transistor; and
a second clamping terminal, inputting a fourth electric level coupled to the control terminal of the first switching transistor and coupled to the control terminal of the second switching transistor through a control circuit;
wherein the third electric level is higher than the fourth electric level;
the control circuit is adapted to control the control terminal of the second switching transistor to receive the fourth electric level of the second clamping terminal when the scanning output terminal outputs the first electric level, and to control the control terminal of the first switching transistor to receive the fourth electric level of the second clamping terminal when the scanning output terminal outputs the second electric level;
wherein the control circuit comprises:
a third switching transistor having a control terminal connected to the control terminal of the first switching transistor, a first connecting terminal connected to the control terminal of the second switching transistor and a second connecting terminal connected to the second clamping terminal;
a fourth switching transistor having a control terminal and a first connecting terminal connected to a third clamping terminal and a second connecting terminal connected to the control terminal of the second switching transistor, wherein a high electric level is inputted to the third clamping terminal;
a fifth switching transistor having a control terminal connected to the control terminal of the second switching transistor and a second connecting terminal connected to the second clamping terminal; and
a sixth switching transistor having a control terminal connected to the control terminal of the second switching transistor, a first connecting terminal connected to the control terminal of the first switching transistor and a second connecting terminal connected to a first connecting terminal of the fifth switching transistor;
wherein the control circuit further comprises a first capacitor connected between the first connecting terminal and the second connecting terminal of the sixth switching transistor; and
when the control terminal of the second switching transistor is controlled to receive the fourth electric level of the second clamping terminal, the first capacitor maintains the sixth transistor to be turned off.

9. The liquid crystal display according to claim 1, wherein the GOA circuit further comprises:
wherein the pull-up circuit further comprises a third capacitor coupled between the control terminals of the first switching transistor, the ninth switching transistor, and the second connecting terminal of the first switching transistor.

10. The liquid crystal display according to claim 4, wherein the GOA circuit further comprises:
wherein the pull-up circuit further comprises a third capacitor coupled between the control terminals of the first switching transistor, the ninth switching transistor, and the second connecting terminal of the first switching transistor.

11. The liquid crystal display according to claim 8, wherein the GOA circuit further comprises:
   wherein the pull-up circuit further comprises a third capacitor coupled between the control terminals of the first switching transistor, the ninth switching transistor, and the second connecting terminal of the first switching transistor.

\* \* \* \* \*